US009672669B1

(12) United States Patent
Canastra

(10) Patent No.: US 9,672,669 B1
(45) Date of Patent: Jun. 6, 2017

(54) KEY FOB CASE

(71) Applicant: Donald J. Canastra, Milltown, NJ (US)

(72) Inventor: Donald J. Canastra, Milltown, NJ (US)

( * ) Notice: Subject to any disclaimer, the term of this patent is extended or adjusted under 35 U.S.C. 154(b) by 0 days.

(21) Appl. No.: 15/145,120

(22) Filed: May 3, 2016

(51) Int. Cl.

| | |
|---|---|
| ***G07C 9/00*** | (2006.01) |
| ***G06K 19/04*** | (2006.01) |
| ***A45C 11/32*** | (2006.01) |
| ***A45C 13/00*** | (2006.01) |

(52) U.S. Cl.
CPC .......... *G07C 9/00119* (2013.01); *A45C 11/32* (2013.01); *A45C 13/005* (2013.01); *G06K 19/041* (2013.01)

(58) Field of Classification Search
CPC ...... G07C 9/00309; G07C 2009/00793; G07C 2209/65; G07C 2209/63; G07C 2209/08; G07C 9/00182; G07C 9/00944; G07C 2009/00373
USPC .......................................................... 340/5.62
See application file for complete search history.

(56) References Cited

U.S. PATENT DOCUMENTS

| | | | | |
|---|---|---|---|---|
| 5,388,691 A * | 2/1995 | White | A45C 11/00 | 206/305 |
| 5,573,109 A * | 11/1996 | Isacson | A45C 15/00 | 206/38.1 |
| 5,850,754 A * | 12/1998 | Dobbins | A44B 15/005 | 206/305 |
| 6,669,017 B2 | 12/2003 | Linihan | | |
| 6,786,332 B1 * | 9/2004 | Patrick | A44B 15/005 | 206/305 |
| D589,698 S | 4/2009 | Ohta | | |
| 8,096,412 B1 | 1/2012 | Britt | | |
| 2006/0081484 A1 | 4/2006 | Smith | | |

FOREIGN PATENT DOCUMENTS

WO WO2008070073 A2 6/2008

* cited by examiner

*Primary Examiner* — Mark Blouin
(74) *Attorney, Agent, or Firm* — Kyle A. Fletcher, Esq.

(57) ABSTRACT

The key fob case is a case that is adapted for use in with an automobile key fobs. The key fob case is a rigid case with a lid. When not in use, the automobile key fob is placed inside the key fob case to prevent inadvertent operation of the buttons on the automobile key fob. The key fob case is closed with the lid, which is a hinged transparent cover that fits the rigid case. The key fob case also has a switched light for use in darkness. The key fob case comprises a container, a cover, a hinge, and a light.

11 Claims, 4 Drawing Sheets

KEY FOB CASE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of key holders, more specifically, a key fob with a hinged protective cover.

SUMMARY OF INVENTION

The key fob case is a case that is adapted for use in with an automobile key fobs. The key fob case is a rigid case with a lid. When not in use, the automobile key fob is placed inside the key fob case to prevent inadvertent operation of the buttons on the automobile key fob. The key fob case is closed with the lid which is a hinged transparent cover that fits the rigid case. The key fob case also has a switched light for use in darkness.

These together with additional objects, features and advantages of the key fob case will be readily apparent to those of ordinary skill in the art upon reading the following detailed description of the presently preferred, but nonetheless illustrative, embodiments when taken in conjunction with the accompanying drawings.

In this respect, before explaining the current embodiments of the key fob case in detail, it is to be understood that the key fob case is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the key fob case.

It is therefore important that the claims be regarded as including such equivalent construction insofar as they do not depart from the spirit and scope of the key fob case. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
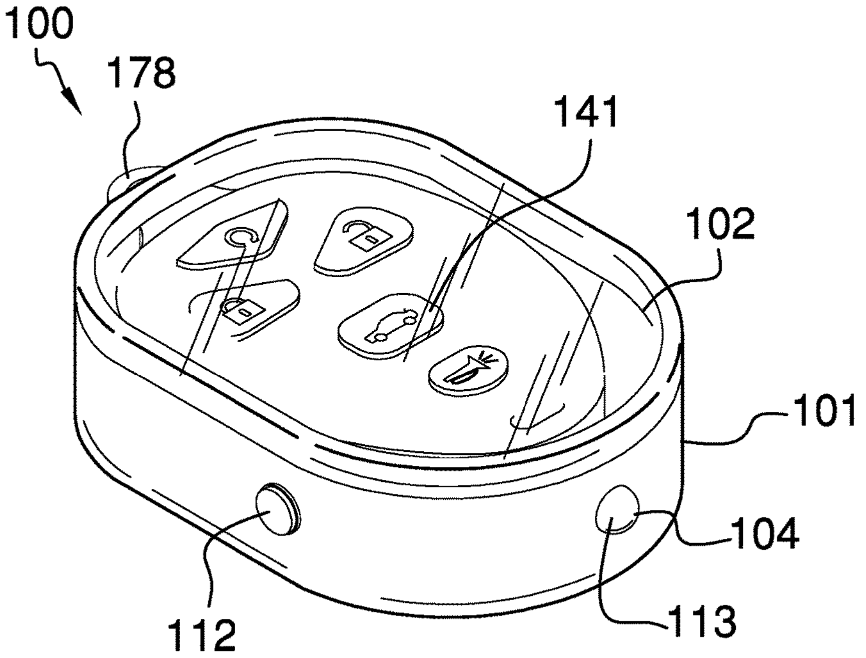
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6.

The key fob case 100 (hereinafter invention) comprises a container 101, a cover 102, a hinge 103, and a light 104. The invention 100 is a case that is adapted for use with an automobile key fob 141. The invention 100 is a rigid case with a lid. When not in use, the automobile key fob 141 is placed inside the invention 100 to prevent inadvertent operation of the buttons on the automobile key fob 141. The invention 100 is closed with the lid which is a hinged transparent cover 102 that fits the rigid case. The invention 100 also has a switched light 104 for use in darkness.

The container 101 is roughly formed in the shape of a rectangular block with rounded corners. The container 101 is further defined with a bottom 121 and a continuous side 122. The face of the container 101 that is distal from the bottom 121 is open and is called the open face 123. The inner dimensions of the container 101 are larger than the outer dimensions of the automobile key fob 141. This allows the automobile key fob 141 to be stored in the container 101. The side 122 of the container 101 is further formed with a light mount 124, a latch hole 125, and a switch mount 126. The light mount 124 is designed to receive and securely hold a light element 113 from the light 104. The switch mount 126 is designed to receive and securely hold a switch 112 from the light 104. The bottom 121 of the container 101 is further formed with a chamber 127, which is sized to hold the battery 111 and the resistor 114 from the light 104. The light 104 is discussed in more detail elsewhere in this disclosure. The latch hole 125 is a small hole formed in the edge 128 of the side 122. The latch hole 125 is sized to receive a clip 131 that holds the cover 102 in the closed position. The cover 102 is discussed elsewhere in this disclosure.

Figure 2:
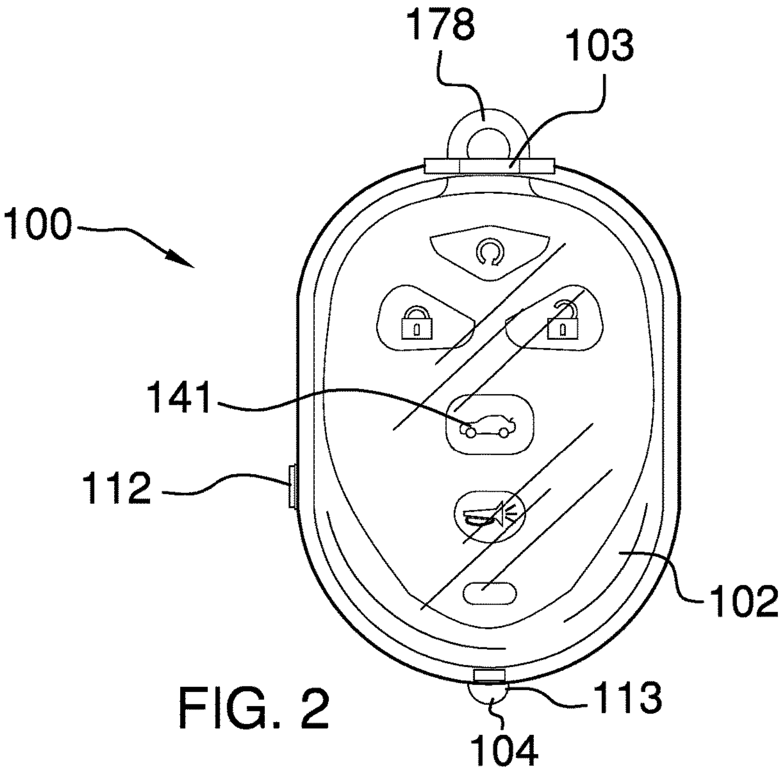
FIG. 2 is a top view of an embodiment of the disclosure.
Figure 3:
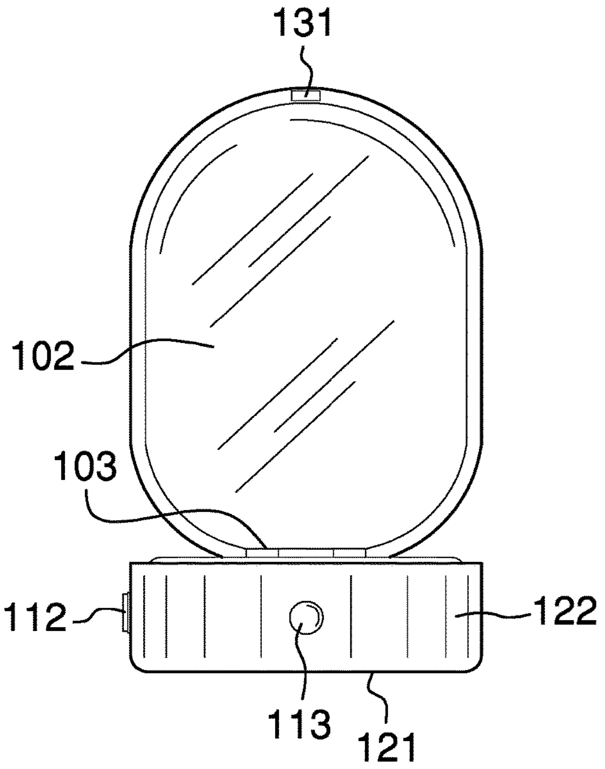
FIG. 3 is a front view of an embodiment of the disclosure.
Figure 4:
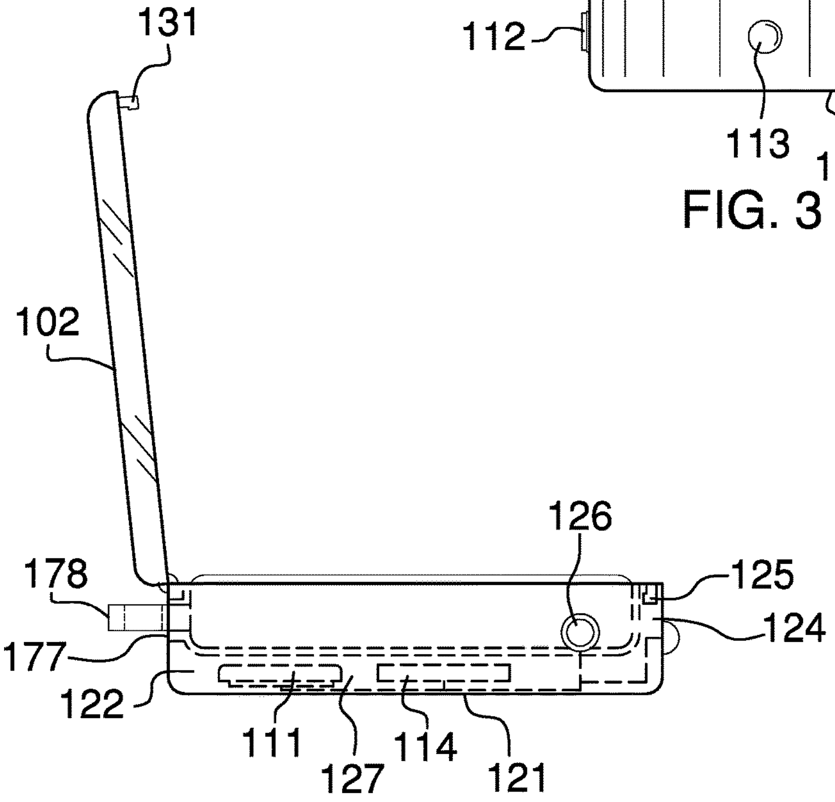
FIG. 4 is a side view of an embodiment of the disclosure.
Figure 5:
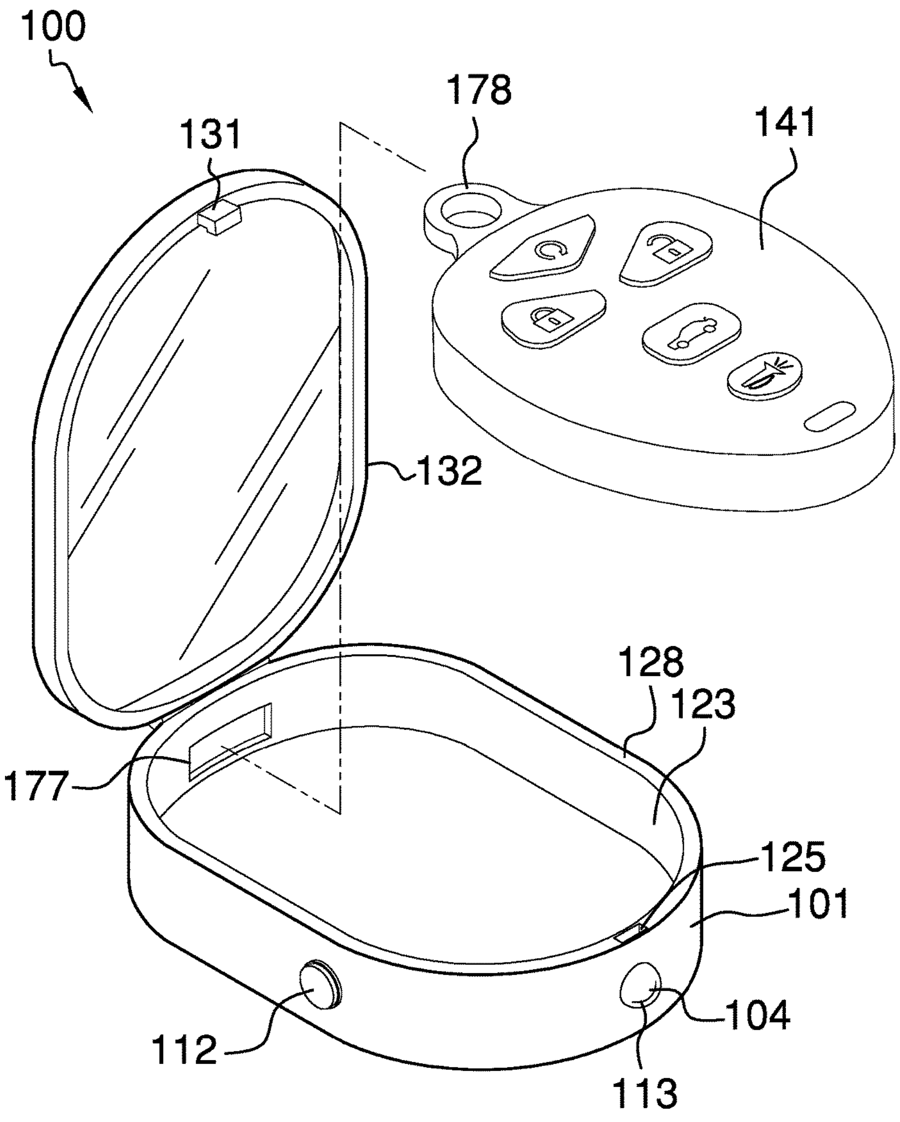
FIG. 5 is an in use view of an embodiment of the disclosure.

As shown in FIGS. 2, 3, and 4, the cover 102 is sized to fit over the open face 123 and is used as a closure for the container 101. The cover 102 is attached to the container 101 with the hinge 103. The hinge 103 allows the cover 102 to open and close the container 101 by rotating away from or towards the open face 123 of the container 101 using the hinge 103 as a pivot point. The cover 102 is formed with a clip 131. The clip 131 is located such that when the cover 102 is rotated into the closed position the clip 131 fits into the latch hole 125 which holds the clip 131 in position. The cover 102 is designed with enough elasticity such that the cover 102 can be slightly bent to release the clip 131 from the latch hole 125. Methods to design the clips 131 and latch holes 125 for this described purpose are known and documented in the art.

Figure 6:
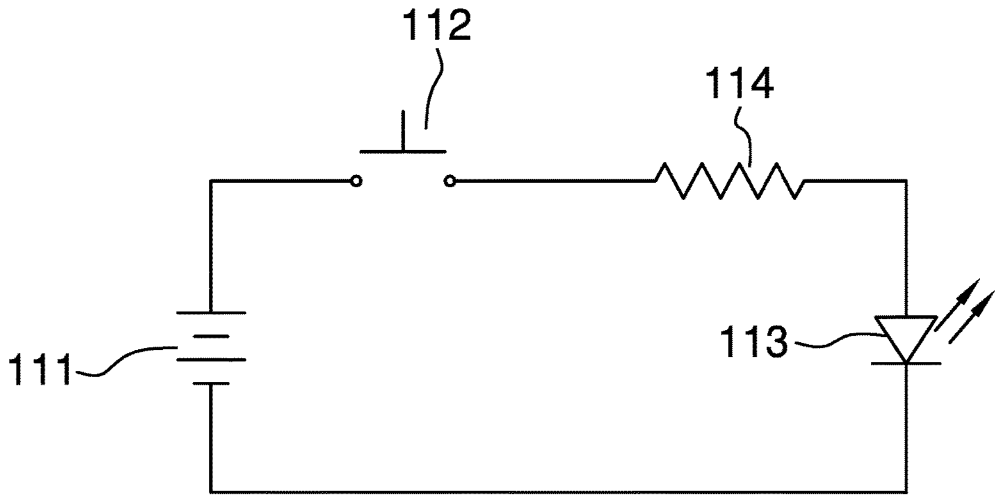
FIG. 6 is a schematic view of an embodiment of the disclosure.

The light 104 is a switch operated light source designed for use in the darkness. As shown in FIG. 6, in the first potential embodiment of the disclosure, the light 104 further comprises a battery 111, a switch 112, a resistor 114, and an LED 113 acting as the light element 113. The battery 111 provides power for the light 104 circuit. The switch 112 is a normally open momentary switch mounted in the switch mount 126. The LED 113 is the light source for the light 104 circuit. The LED 113 is mounted in the light mount 124. The resistor 114 is used as a limit resistor to prevent current surges through the LED 113. As shown in FIG. 6, the battery 111, the switch 112, the resistor 114 and the LED 113 are wired in series.

In the first potential embodiment of the disclosure, the container 101 is molded from plastic. The cover 102 is also molded from a transparent plastic. The portion of the hinge 103 is molded as a part of the container 101 and a portion of the hinge 103 is molded as a part of the cover 102. Suitable plastics include, but are not limited to, poly(methyl methacrylic) or polycarbonate. The hinge 103 is joined with a commercially available pin which acts as a hinge pin. The components of the light 104 are commercially available.

Located adjacent to the hinge 103 is a keychain hole 177. The keychain hole 177 is provided below the hinge 103, and is adapted to enable an eyelet 178 of the automobile key fob 141 to extend there through. The eyelet 178 of the automobile key fob 141 enables a key ring (not depicted) to be attached thereto.

The following definitions were used in this disclosure:

Automobile: As used in this disclosure, an automobile is a road vehicle that is powered by an internal combustion engine.

Battery: As used in this disclosure, a battery is a container consisting of one or more cells, in which chemical energy is converted into electricity and used as a source of power.

Inner Dimension: As used in this disclosure, the term inner dimension describes the span from a first inside or interior surface of a container to a second inside or interior surface of a container. The term is used in much the same way that a plumber would refer to the inner diameter of a pipe.

LED: As used in this disclosure, an LED is an acronym for a light emitting diode. A light emitting diode is a 2 lead semiconductor that is also a light source.

Light: As used in this disclosure, a light is an electrical device that generates visible light to illuminate objects so they can be seen.

Hinge: As used in this disclosure, a hinge is a device that permits the turning, rotating, or pivoting of a first object relative to a second object.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pivot: As used in this disclosure, a pivot is a rod or shaft around which an object rotates or swings.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A case comprising:
a container, a cover, a hinge, and a light;
wherein an automobile key fob is inserted into the case;
wherein the container is rigid;
wherein the automobile key fob is placed inside the case to prevent inadvertent operation of the buttons on the automobile key fob;
wherein the case closed with the cover;
wherein the light is a switch operated light;
wherein the light further comprises a battery, a switch, and a light element;
wherein the switch is a normally open momentary switch;
wherein the light element comprises an LED;
wherein the light further comprises a resistor;
wherein the resistor functions as a limit resistor;
wherein the battery, the switch, the resistor and the LED are wired in series;
wherein the container is formed in the shape of a rectangular block with rounded corners;
wherein the container is further defined with a bottom, a continuous side, and an open side;
wherein the inner dimensions of the container are larger than the outer dimensions of the automobile key fob;
wherein the continuous side of the container further comprises a light mount and a switch mount.

2. The case according to claim 1 wherein
the light mount is designed to receive and securely hold the light element;
wherein the switch mount is designed to receive and securely hold the switch.

3. The case according to claim 2 wherein the bottom of the container is further formed with a chamber;
wherein the chamber holds the battery and the resistor.

4. The case according to claim 3 wherein the continuous side of the container further comprises a latch hole.

5. The case according to claim 4 wherein the latch hole is a hole formed in the edge of the continuous side.

6. The case according to claim 5 wherein the cover is sized to fit over the open face.

7. The case according to claim 6 wherein the cover is attached to the container with the hinge.

8. The case according to claim 7 wherein the cover further comprises a clip.

9. The case according to claim 8 wherein the latch hole is sized to receive the clip to holds the cover in the closed position.

10. The case according to claim 9 wherein the cover is designed with enough elasticity such that the cover can be slightly bent; wherein the cover is formed from a transparent material.

11. The case according to claim 10 wherein located adjacent to the hinge is a keychain hole; wherein the keychain hole is provided below the hinge; wherein the keychain hole enables an eyelet of the automobile key fob to extend there through.

* * * * *